United States Patent [19]

Lantos et al.

[11] Patent Number: 4,850,619
[45] Date of Patent: Jul. 25, 1989

[54] HOSE CONNECTING SYSTEM AND METHOD FOR PROVIDING THE HOSES WITH CONNECTIONS

[75] Inventors: Elemér Lantos, Budapest; György Gyöngyösi, Szeged; Sándor Antal, Budapest, all of Hungary

[73] Assignee: Taurus Gumiipari Vallalat, Budapest, Hungary

[21] Appl. No.: 210,624

[22] Filed: Jul. 23, 1988

[51] Int. Cl.⁴ .................................. F16L 39/02
[52] U.S. Cl. .................................. 285/149; 285/106; 285/915; 29/469.5
[58] Field of Search .............. 285/106, 149, 242, 915; 29/469.5

[56] References Cited

U.S. PATENT DOCUMENTS

| | | | |
|---|---|---|---|
| 2,262,228 | 11/1941 | Gametson | 285/149 X |
| 2,749,150 | 11/1952 | Kaiser | 285/106 X |
| 3,347,571 | 10/1967 | New | 285/149 |
| 3,462,177 | 8/1969 | Skinner et al. | 285/149 |
| 3,936,118 | 2/1976 | Theiery | 285/149 X |
| 4,143,892 | 3/1979 | Murphy | 285/149 |
| 4,449,740 | 3/1984 | Buzzi | 285/149 |
| 4,569,541 | 2/1986 | Eisenzimmer | 285/149 |
| 4,605,466 | 8/1986 | Eisenzimmer | 285/149 X |

FOREIGN PATENT DOCUMENTS 562352  6/1944  United Kingdom ............ 285/149

Primary Examiner—David A. Scherbel
Assistant Examiner—Jerrold D. Johnson
Attorney, Agent, or Firm—Schweitzer & Cornman

[57] ABSTRACT

An adhesive hose coupling which comprises an outer connecting element for fixing and enclosing the end of a hose to be coupled having a soul, an inner sleeve having peripheral openings in a smooth outer surface thereof and being attached from an end element, said inner sleeve with end element being adapted to provide connection for the coupling, said inner sleeve being adapted to be expanded against the soul of a hose to be coupled without appreciably restricting the flow of a flowing medium through the hose, and a space filler for disposition in a space formed between said outer connecting element, end element, and a hose to be coupled.

6 Claims, 1 Drawing Sheet

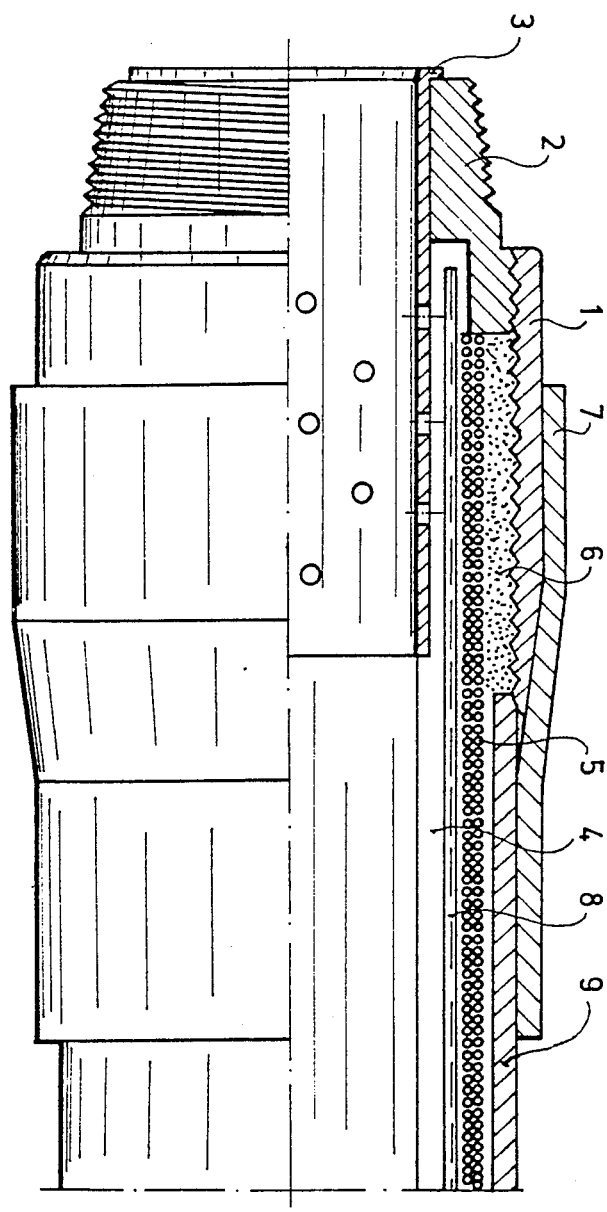

HOSE CONNECTING SYSTEM AND METHOD FOR PROVIDING THE HOSES WITH CONNECTIONS

FIELD OF THE INVENTION

The present invention relates to an adhesive hose coupling filled at least partially with space filler and a method for providing hoses with the coupling.

BACKGROUND OF THE INVENTION

Various fixed couplings are known for high-pressure hoses, particularly for connecting hoses reinforced with metal inserts. The most frequently used couplings of that are those having pressed, bound and/or screwed connections. A common characteristic of such connections is that to achieve safe sealing and connection, a higher pressure must prevail in course of installation on the surface of element arranged in the inside of the hose than the prevailing pressure which may occur in use.

U.S. Pat. No. 3,347,571 discloses a pressed connecting structure, U.S. Pat. No. 1,576,764 discloses a screwed connection, and German Federal Republic Pat. No. 1,223,209 relates to a bound connection.

Couplings fixed by gluing are disclosed for example in Hungarian Pat. No. 168,837, French Pat. No. 2,214,852 and British Pat. No. 2,088,506 and are considered to be the most modern ones in comparison to the aforementioned structures.

However, in the case of glued connections, if one can deal at all with the problem of building up the hoses, that it would require a most complicated coupling device and installation would require a greater expenditure of labor. A further problem is that welding of the special connectors and hose couplings having a large diameter cannot be realized in all cases.

Generally couplings of large diameter highly loadable hoses are assembled while the hoses are being built up and if the hoses are based on some elastomer then vulcanization is carried out after assembling the hose with the coupling. For example, couplings of every marine oil inlet and racking hose are made in this manner. With couplings to be installed during the building up and when the dimension of the final product are known in advance, hoses cannot be produced in greater length for the purpose of storage. Row elements below the rigid connecting element are vulcanized without applying pressure or at medium pressures and, therefore, bubbles and delamination of layers can often take place.

DESCRIPTION OF THE INVENTION

The aim of the invention is to develop a hose coupling without the drawbacks of known couplings and to provide a method for the assembly of the couplings on the finished hoses.

The invention is based on the recognition that couplngs faultlessly functioning under all prevailing circumstances can be obtained by the simultaneous application of an inner supporting element and a space filler which enables that coupling can be improved between the reinforcing layer and the coupling by the internal pressure.

The coupling of the invention, i.e. the elements thereof can be easily and quickly installed separately from the actual production of the hoses. Thus, safety of the coupling can be improved and optional elements interconnecting the ends can be welded to the connections.

The essential characteristic of the coupling according to the invention is in that inner sleeve of the outer connecting element serving for fixation and encasing, and the element for sealing and coupling are interconnected, while the inner sleeve is expanded and suitably has a smooth surface and is provided with one or more openings to allow the introduction of the inner pressure and/or it is connected to the element for sealing and local connection so as to enable penetration of the inner pressure between the two elements. The space filler is arranged in the space confined by the hose reinforcement, the sealing and coupling end element, the outer connecting element and the hose cover.

The inner part of the hoses formed with an annular cross-section and made of rubber, is referred to in this field as the "soul" of a hose. In the coupling according to the invention the glued, vulcanized and/or pressed "soul" is located between the sealing and coupling end element and the inner sleeve.

In a preferred embodiment of the invention the outer connecting element is connected by one single thread to the sealing and coupling end element and the hose cover. Expansion of the surface needed for connection is also achieved with one single screwed connection.

According to a further preferred embodiment of the invention the diameter of the inner sleeve is enlarged by pressing.

The outer connecting element and the cover are interconnected with a conical end thread, to prevent penetration of some external medium. The connecting means is provided by a separately applied flexible sleeve assuring gradual external transition between the parts of the coupling. There is a electrically conducting connection between the inner sleeve and the sealing and coupling end element.

DESCRIPTION OF THE DRAWING

The invention is described in detail by means of a preferred embodiment with the aid of the accompanying sole figure of the drawing, which is a partial cross section showing a hose coupling, according to the invention.

DESCRIPTION OF PREFERRED EMBODIMENT

A sealing and coupling end element 2 (hereinafter referred to as "end-element") and an outer connecting element 1 are screwed together. This end-element 2 can be welded at 14 to an inner sleeve 3. Welding can be carried out prior to installing the connection. Expediently the outer connecting element 1 is formed with an identical thread-profile throughout its full length. Connection of a main reinforcing layer 5, fixation of the element 2 with a screw-thread and connection of the cover 9 of the hose 10 are achieved with the same thread. Connection of the soul 4 of the hose sealing are achieved by gluing, vulcanizing and/or pressing the soul between the end-element 2 and the inner sleeve 3. The soul 4 of the hose is bent back over the carcass 8 or on the end of the carcass 8 there is a layer formed which is impermeable to liquid and gas. The space between the main reinforcing layer 5, the outer connecting element 1, the end-element 2 and the cover 9 is filled at least partially with a space-filler 6 which is separate from the material of the hose.

The sleeve is expanded after having inserted the inner sleeve 3 into the inside of the hose 10. It does not narrow the inner diameter of the hose, and if yes, then only to a negligible extent. The pressure formed as a result of the expansion promotes sealing of the soul and fixation of the reinforcing layer 5. The surface of the inner sleeve 3 is provided with one or more openings 12 and during expansion its diameter is enlarged to such an extent that with rising pressure introduced within the inner sleeve 3 presses the reinforcing layer 5 toward the outer connecting element 1. The surface of inner sleeve 3 is smooth and it does not contain any element that could prevent penetration of the internal pressure above a certain pressure level.

The unexpected consequence of this formation is that fixation of the main reinforcing layer 5 is guaranteed by the connection due to the frictional shearing forces arising on a the threaded surfaces even if no adhesive was applied to the contacting surfaces. Strength of the coupling is increased by introducing a space filler 6 which establishes an adhesive joint between surfaces. Considering that adhesion and frictional shearing force resulting from internal pressure can carry the load in itself then safety of the bond can be considerably increased by their combined application.

The inner sleeve 3 is suited for assuring axial loadability of the hose even when if there is no internal pressure in the hose. The inner sleeve 3 prevents detachment of the reinforcing layer 5 from the coupling under tensile loading.

Impermeability to liquids is achieved partly by a subsequently applied outer flexible sleeve 7 and the threaded connection between the outer connecting element 1 and the cover 9 comprising a conical threaded portion.

In applying the coupling according to the invention bubbles that result from the lack of pressure and appearing under the connections during its production can be eliminated. A further advantage is in that sealing between the connections can be formed in a fully closed space with the highest safety.

The method for producing the coupling according to the invention is also a part of the invention. The end of the finished hose is formed with stagger, on the end of the textile inserts a layer is formed that is impermeable to liquid and gas. A sealing tongue is thus obtained. The connecting elements are applied, thereafter the inner sleeve is expanded under the sealing tongue; the outer shell is arranged and the space-filler delivering the internal pressure is introduced between the reinforcing inserts and the connection in the already installed connection, thereafter the inner sleeve is also expanded below the reinforcing inserts.

Accordingly, in course of the process according to the invention the end of the hose is staggered by using a scraper which is turned around the axis of the hose. Thereafter the end of the soul 4 is bent back to the end of the carcass 8 or a separate layer formed that is impermeable to liquid and gas, thus obtaining the sealing tongue. The end-element 2 and the inner sleeve 3 are arranged. Thereafter the inner sleeve 3 is expanded expediently below the sealing tongue. Next the outer connecting element is screwed onto the end-element 2 and the cover 9. When it is desired, the end of the soul 4 and the surface of the end-element 2 contacting the sealing tongue are primed for gluing of for the bonding of metal to rubber.

In the next phase of the process the space between the main reinforcing layer 5 and the outer connecting element 1 or at least the space in the vicinity of the ends of the reinforcing layer 5 is filled with the space-filler. The purpose of this operation is to prevent rupture of the infrastructure at the ends of the reinforcing layer. Space-filling can be expediently achieved in additional areas by extending the space-filling under the cover 9, the outer connecting element 1 or by reducing the inner diameter of the outer connecting element 1, eventually by combination thereof. Suitably a binding-gluing material can be used as the specefiller 6 and that manner safety of bond can be increased.

Thereafter a tool exerting internal pressure is used to expand the part of the inner sleeve 3 under the reinforcing layer 5. By the expansion it can be achieved that the inernal sleeve should not reduce the flow cross-section at all, and if yes, then only to a negligible extent. The pressure of the medium delivered in the hose also presses the reinforcing layer 5 through the hose structure against the inner surface of the outer connecting element 1. This effected increasing the inner pressure increases the forces within the coupling and the reinforcing layer 5. The ability to introduce pressure, passage of transport medium through the coupling will be improved by the fact that the outer surface of the sleeve 3 below the soul 4 is smooth and it is provided with the proper openings 12.

The outer flexible shell 7 prevents penetration of moisture and it provides a gradual modules transition, the inner surface of which is expediently glued or otherwise bound to the structural elements below it with a rubber to metal or rubber to elastomer bond.

Optionally, as a finishing step of operation, the coupling also can be subjected to heat treatment.

The coupling according to the invention can be successfully employed also with synthetic hoses.

We claim:

1. An adhesive hose coupling which comprises an outer connecting element for fixing and enclosing the end of a hose to be coupled having a soul, an inner sleeve having peripheral openings in a smooth outer surface thereof and being attached from an end element, said inner sleeve with end element being adapted to provide connection for the coupling, said inner sleeve being adapted to be expanded against the soul of a hose to be coupled without apreciably restricting the flow of a flowing medium through the hose, and a space filler for disposition in a space formed between said outer connecting element, end element, and a hose to be coupled.

2. The adhesive hose coupling of claim 1, wherein the outer connecting element has a single thread on its interior, adapted to be screwably attached to a thread applied to the exterior of said end element and is adapted to press against the outer surface of a hose to be coupled.

3. The adhesive hose coupling of claim 1, wherein the outer connecting element is adapted to establish a tight connection through a conical threading, with the outer surface of a hose to be coupled, and the coupling further comprises an outer flexible sleeve for providing an outer watertight covering for the coupling.

4. The adhesive hose coupling of claim 1, wherein the inner sleeve and the end element are welded to each other to form an electrically conducting connection between them.

5. A process for producing the adhesive hose coupling of claim 1, which comprises staggering the end of a hose to form a sealing tongue, inserting the inner sleeve into the hose, filling a space between the end element and the exterior of the hose with a space filler, screwing the outer connecting element over the end element, the space filler and the exterior of the hose, and expanding the inner sleeve within the hose.

6. The process of claim 5, further comprising applying an outer flexible sleeve over the coupling.

* * * * *